March 12, 1940.  G. L. McKEE  2,193,199
COUPLING
Filed Nov. 17, 1938  2 Sheets-Sheet 1

INVENTOR.
Glenn L. McKee
BY Carlos G. Stratton
ATTORNEY.

March 12, 1940.　　　G. L. McKEE　　　2,193,199
COUPLING
Filed Nov. 17, 1938　　2 Sheets-Sheet 2
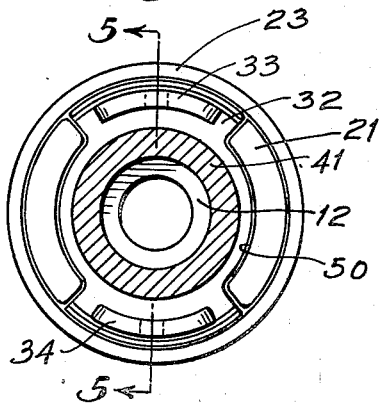
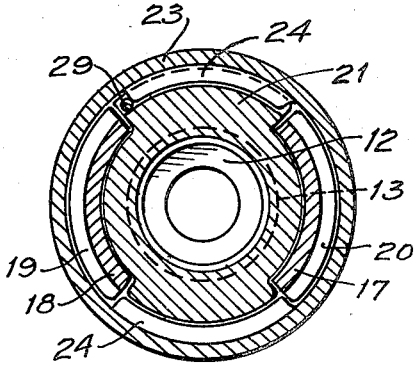
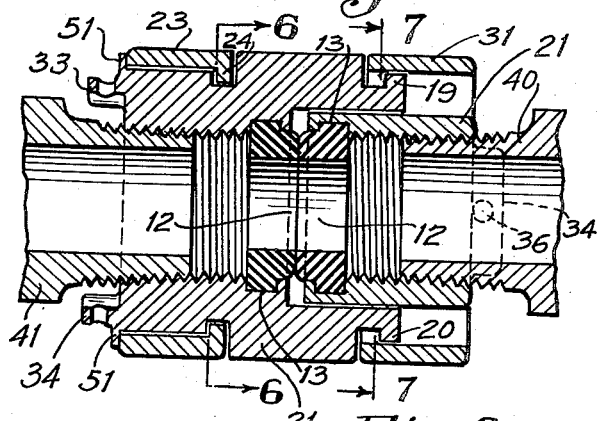
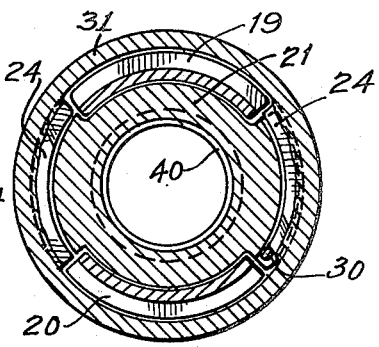
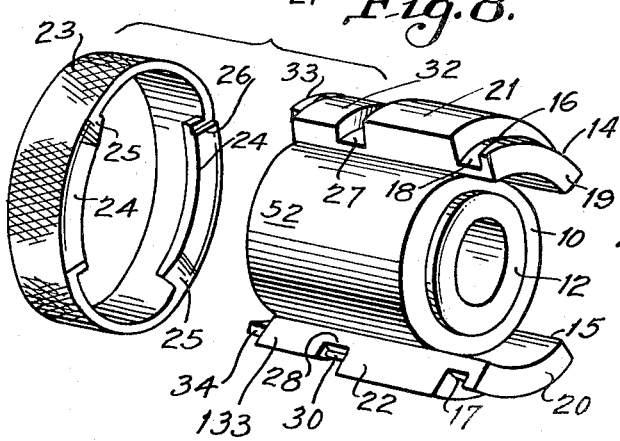
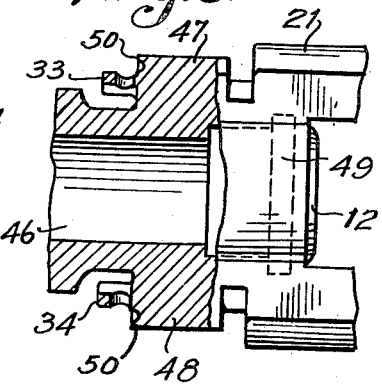
INVENTOR.
Glenn L. McKee
BY Carlos G. Stratton
ATTORNEY.

Patented Mar. 12, 1940

2,193,199

UNITED STATES PATENT OFFICE 2,193,199

COUPLING

Glenn L. McKee, Bakersfield, Calif., assignor to McKee Brothers Corporation, Bakersfield, Calif.

Application November 17, 1938, Serial No. 240,912

3 Claims. (Cl. 285—177)

My invention relates to a universal coupling that is particularly adapted for hose or other conduit carrying fluids, or fluids under pressure.

An object of my invention is to eliminate the necessity of pins, springs, bolts and the like in preventing parts of such a coupling from unlocking.

Another object is to provide a coupling that will not become unfastened by turning either or both of the hoses or other conduits.

Still another object is to provide a coupling for high pressure hose and other conduits that provides identical coupling members and eliminates the use of male and female coupling members.

The invention also comprises novel details of construction and novel combinations and arrangements of parts, which will more fully appear in the course of the following description.

In the drawings, like reference characters designate similar parts in the several views.

Figure 4 is a section taken on the line 4—4 of Figure 3.

Figure 5 is a section taken on the line 5—5 of Figure 4, showing my coupling in an unlocked position.

Figure 6 is a section taken on the line 6—6 of Figure 5.

Figure 7 is a section taken on the line 7—7 of Figure 5.

Figure 8 is a perspective view of one of my coupling members and its associated ring member.

Figure 9 is a modified form of a coupling member.

Figure 1:
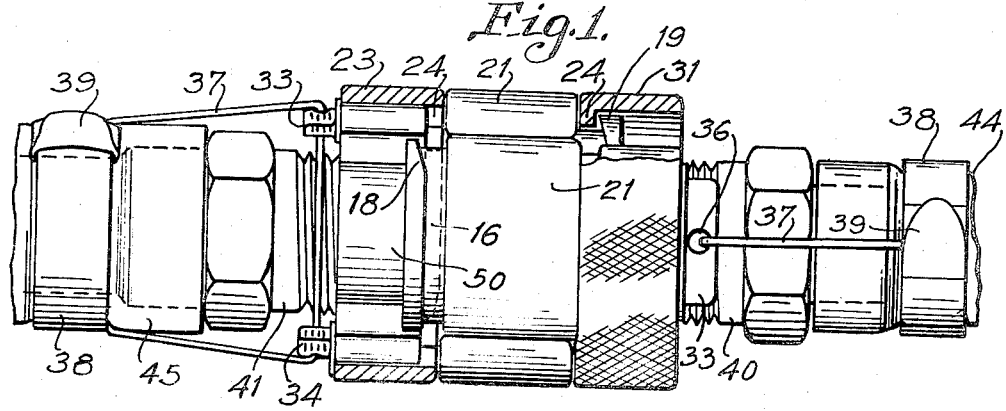
Figure 1 is an elevation, partly in section, showing my coupling in a locked position.

Referring more in detail to the drawings, the reference number 10 generally designates a cylindrically shaped body member of my coupling members. A rubber gasket 12 fits in a recess 13 in the body member 10 and protrudes from the forward end of the body member. In practice, the gaskets on my two coupling members abut each other, as shown in Figure 5.

Projecting lips 14 and 15 extend forward from the body member. The lips are circumferentially grooved, as shown at 16 and 17 respectively. One end of each of the grooves is widened and flared outwardly, as shown at 18, somewhat similar to a part of a bayonet joint. The tapered ends 18 are disposed in opposite directions when the coupling elements are placed together.

It will be noticed that the thickness of the lips 14, 15, at the ends 19 and 20 thereof, is less than the thickness of the base portions of the lips, to wit, 21 and 22 respectively. This difference in diameter between the two lips is substantially the thickness of rings 23 and 31, and the rings are of such dimension that they will slide over the ends 19 and 20 of the lips and abut the base portions 21, 22 of the lips.

The rings 23 and 31 have inwardly directed flanges 24 that are beveled at one end 25 and have a step 26 at the opposite end. The rings 23 and 31 are knurled on their outer surfaces.

To the rear of the base portions 21, 22 are grooves 27 and 28 respectively. Pins 29 and 30 provide stops at one end of the grooves 27, 28 respectively.

To the rear of the grooves 27, 28 are curved rib members 32 and 133 of approximately the same diameter as the ends 19, 20 of the lips. In other words, the rings 23, 31 are free to rotate upon these ribs. Between the ribs 32 and 133, between the base portions 21, 22 and between the lips 14 and 15 are exposed the opposite sides of the body member 10. The thickness of the ribs 32 and 133 approximates the width of the flanges 24 on the rings, and the length of these flanges approximates the distance between the ribs 32, 133. Moreover, these exposed faces 52 are approximately the width of the lips and base portions on the other coupling member. The under sides of the lips and base portions are curved to fit the body member 10 on the other coupling member.

Lugs 33, 34 project rearwardly from the ribs 32, 133 and have apertures 36 for wires 37, which are held under bands 38, which bands are held by clamps 39 such as shown in my co-pending application Serial No. 125,650, filed February 13, 1937.

Connectors 40, 41 are screwed into internally threaded body members as best shown in Figure 5. The connectors have annularly grooved tubular members 42, 43. The bands 38 clamp hoses 44, 45 on the tubular members 42, 43 respectively.

In the form shown in Figure 9, the tubular member 46 is integral with the ribs 47, 48 and with the body member 49.

Both forms of my invention have rims 50 on the rib members. After the parts are assembled, with the rings 23, 31 in position on the ribs, the rims 50 are preferably swaged, as shown at 51 in Figure 5, to maintain the rings on the ribs.

Figure 2:
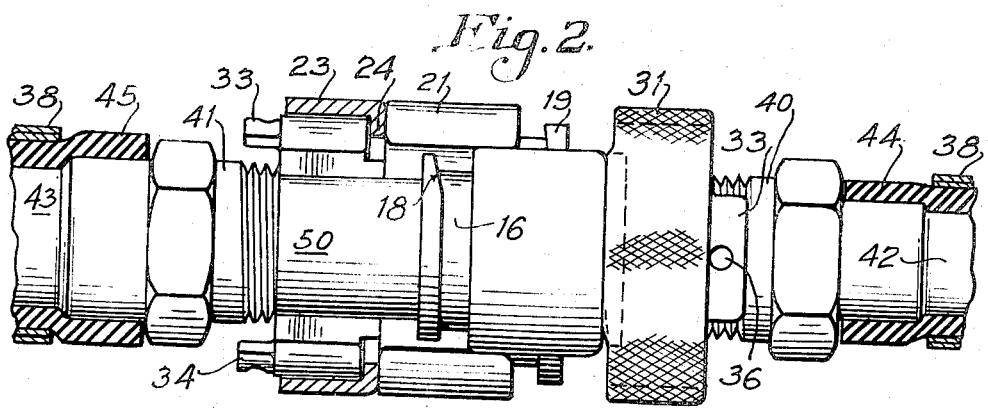
Figure 2 shows my said coupling in an unlocked and partly separated position.
Figure 3:
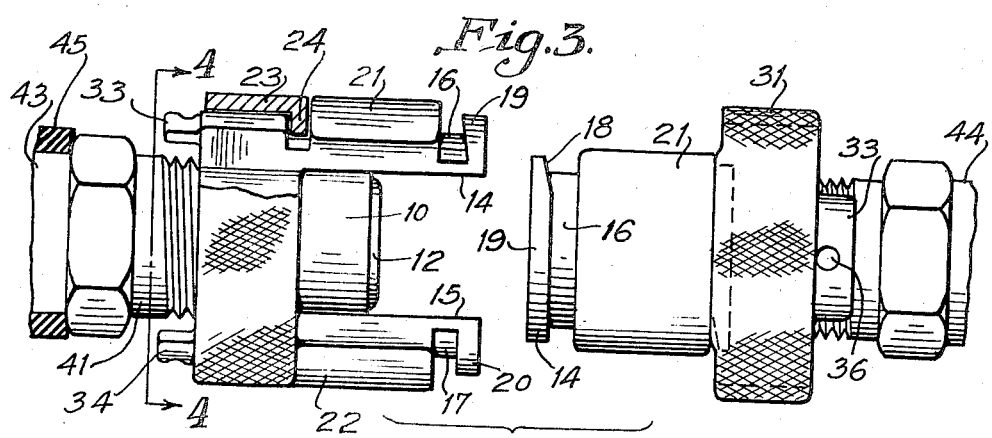
Figure 3 shows the members of my said coupling separated from each other.

In the use of my coupling, the two coupling members are advanced toward each other from the positions shown in Figure 3. The lips 14, 15 and the base portions 21, 22 slide along the exposed sides of the body member 10 on the opposite coupling member, as suggested in Figure 2. After the two coupling members are each bottomed in the other member, the rings 23, 31 are rotated clockwise, viewing each from its respective connector 42 or 43. The rings are, therefore, turned in opposite directions. The coupling members are thereby locked together by means of the flanges 24 of the ring on one member engaging the grooves 16, 17 on the other coupling member.

The widened entrances 18 to the grooves 16, 17 facilitate the admission of the flanges 24 to said grooves. Further movement of the flanges along said grooves completes the locking of the two coupling members together. It is to be understood that gaskets are being forcibly compressed against each other, to make a fluid-tight connection, as the tapered ends 25 of the flanges 24 are being forced into the widened entrances 18 of the grooves and the thicker portion of the flanges moved therefrom into the narrower portions of said grooves. The rings 23, 31 act as bayonet clasps in this connection. The pins 29, 30 engage the flanges and limit the rotation of the rings on their respective coupling elements.

In order to disconnect the coupling, both rings must be rotated in counter-clockwise directions, viewing the rings from their respective connectors; that is, the rings must be turned in opposite directions to disconnect the coupling, and of course both rings must be turned to their unlocked positions before the coupling elements may be drawn apart.

In Figures 5, 6 and 7, the flanges 24 on the rings 23, 31 are not locked, so that the coupling members may be drawn apart or locked by turning one or both of the rings. Figure 1 shows the coupling members locked together.

While I have illustrated and described what I now regard as the preferred embodiment of my invention, the construction is, of course, subject to modification without departing from the spirit of my invention. I, therefore, do not wish to restrict myself to the particular form of construction illustrated and described, but desire to avail myself of all modifications which may fall within the scope of the appended claims.

Having thus described my invention, what I claim and desire to secure by Letters Patent is:

1. A coupling comprising substantially identical elements, each element having projecting members and having recesses therebetween to receive the projecting members of the other element, the projecting members having locking grooves, and additional grooves aligned with the locking grooves of the projecting members when the elements are placed in a position to be locked together, movable ring members on the elements respectively having inwardly projecting flanges thereon, said flanges being disposed in said additional grooves when the rings are in an unlocked position and said flanges being moved into the locking grooves of the opposite element when in locked position.

2. A coupling comprising substantially identical elements, each element having projecting members and having recesses therebetween to receive the projecting members of the other element, a resilient gasket secured in the inner end of each element and contacting each other when the elements are in locked position, the projecting members having locking grooves, and additional grooves aligned with the locking grooves of the projecting members when the elements are placed in a position to be locked together, movable ring members on the elements respectively having inwardly projecting flanges thereon, said flanges being disposed in said additional grooves when the rings are in an unlocked position and said flanges being moved into the locking grooves of the opposite element when in locked position.

3. A coupling comprising substantially identical elements, each element having projecting members and having recesses therebetween to receive the projecting members of the other element, the projecting members having locking grooves and flaring shoulders, one end of each of the grooves being thereby widened and flared outwardly, a resilient gasket secured in the inner end of each element and abutting when the elements are in locked position, and additional grooves aligned with the locking grooves of the projecting members when the elements are placed in a position to be locked together, movable ring members on the elements respectively having inwardly projecting flanges thereon, said flanges having tapered portions to initially engage the flared portions of said shoulders when the rings are moved toward locking positions with respect to said shoulder, the tapered portions of the flanges and the flaring shoulders moving the elements together against the yielding, resilient force of the gaskets, when the ring members are moved toward a locking position.

GLENN L. McKEE.